United States Patent
Kawakita

(10) Patent No.: US 12,545,539 B2
(45) Date of Patent: Feb. 10, 2026

(54) SHEET PROCESSING APPARATUS AND IMAGE FORMING APPARATUS

(71) Applicant: CANON KABUSHIKI KAISHA, Tokyo (JP)

(72) Inventor: Jun Kawakita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/817,701

(22) Filed: Aug. 28, 2024

(65) Prior Publication Data
US 2025/0122041 A1 Apr. 17, 2025

(30) Foreign Application Priority Data

Oct. 16, 2023 (JP) .................. 2023-178022

(51) Int. Cl.
| | | |
|---|---|---|
| *B65H 9/00* | (2006.01) | |
| *B65H 7/02* | (2006.01) | |
| *B65H 9/10* | (2006.01) | |
| *B65H 33/06* | (2006.01) | |

(Continued)

(52) U.S. Cl.
CPC .............. *B65H 9/002* (2013.01); *B65H 7/02* (2013.01); *B65H 9/103* (2013.01); *B65H 33/06* (2013.01); *G03G 15/0189* (2013.01); *G03G 15/6547* (2013.01); *G03G 15/6573* (2013.01); *B65H 2301/331* (2013.01); *B65H 2301/3613* (2013.01); *B65H 2403/41* (2013.01); *B65H 2404/1424* (2013.01); *B65H 2404/161* (2013.01); *B65H 2801/06* (2013.01); *G03G 2215/0089* (2013.01)

(58) Field of Classification Search
CPC ................... B65H 9/103; B65H 9/002; B65H 2404/1424; B65H 2403/41; B65H 2404/161; B65H 2301/3613; B65H 33/06; G03G 15/6547; G03G 2215/0089
See application file for complete search history.

(56) References Cited

U.S. PATENT DOCUMENTS 10,068,162 B2 * 9/2018 Lin .......................... H04N 1/23
2007/0075479 A1 4/2007 Obuchi et al.

FOREIGN PATENT DOCUMENTS

JP 4785474 B2 10/2011

* cited by examiner

*Primary Examiner* — Jeremy R Severson
(74) *Attorney, Agent, or Firm* — ROSSI, KIMMS & McDOWELL LLP

(57) ABSTRACT

A sheet processing apparatus includes a shift unit including a pair of first conveying rollers that nip and convey a sheet and being able to move in a width direction orthogonal to a conveyance direction of the sheet in a state of nipping the sheet; a drive gear configured to transmit a driving force from a drive motor; a rack gear including a rack portion that meshes with the drive gear, the rack gear being configured to receive the driving force from the drive gear via the rack portion and, thereby, move the shift unit in the width direction in a state of nipping the sheet with a pair of first conveying rollers; a guide member configured to guide movement of the shift unit in the width direction; and a supporting member configured to nip the rack gear between the supporting member and the drive gear and support the rack gear, in which the rack gear is rotatable with respect to the shift unit on a plane parallel to the conveyance direction and the width direction.

7 Claims, 12 Drawing Sheets

(51) Int. Cl.
*G03G 15/00* (2006.01)
*G03G 15/01* (2006.01)

SHEET PROCESSING APPARATUS AND IMAGE FORMING APPARATUS

BACKGROUND OF THE INVENTION

Field of the Invention

The present invention relates to a sheet processing apparatus and an image forming apparatus including the sheet processing apparatus.

Description of the Related Art

In recent years, a demand on an image forming apparatuses that form an image on a sheet such as a printing machine for product quality increases and becomes higher than before. For this reason, in recent years, there are many image forming apparatuses that perform post-process processing such as processing or bookbinding on a sheet after printing.

In such an image forming apparatus that performs post-process processing, a mechanism or the like for grouping sheets and shifting the sheets to different positions for each group in the width direction to sort the sheets into stack trays is put into practical use in order to simplify the post-process processing. Furthermore, in recent years, in order to respond to demands from the market for various media handling when discharging the sheets by shifting the sheets to different positions for each group in the width direction, the image forming apparatus is required to increase the amount of shifting in the width direction of the sheets.

Japanese Patent Publication No. 4785474 discloses a sheet processing apparatus including a sorting mechanism that moves a sheet in a width direction to shift a position of the sheet in the width direction in a state where the sheet is sandwiched between a pair of conveying rollers disposed on a conveying path of the sheet. In the sheet processing apparatus in Japanese Patent Publication No. 4785474, the position of the shift unit is regulated by moving a shift unit pivotally supporting the pair of conveying rollers along a slide rail provided in the apparatus main body. In the sheet processing apparatus in Japanese Patent Publication No. 4785474, the position of the shift unit is regulated in order to ensure the meshing of the gears of a drive train connection portion for transmitting the drive from the apparatus main body to the shift unit.

However, in Japanese Patent Publication No. 4785474, the position restriction at the above two positions is excessively restrained with respect to the shift unit because there is a variation in dimensional tolerance of the component. Such excessive restraint on the shift unit causes a failure to maintain appropriate backlash between gears due to absorption of distortion of components or a gap between fitting portions of the components by backlash bias.

As a result, since a distance between gears of a drive connection portion becomes too short, a tooth face abuts against a tooth bottom, and the load at the time of driving the shift unit increases. Alternatively, since the distance between the gears becomes too long, backlash increases, and the movement amount of the sheet in the width direction deviates from the target movement amount.

Therefore, in the sheet processing apparatus in Japanese Patent Publication No. 4785474, it is necessary to take measures such as adjustment at the time of assembly so that the distance between the gears becomes appropriate. At this time, in the sheet processing apparatus of Japanese Patent Publication No. 4785474, it is necessary to adjust a distance between gears to be appropriate in the entire region in a width direction where the shift unit moves.

However, the sheet processing apparatus in the related art has a problem that it is difficult to adjust the distance between the gears of the drive connection portion between the shift unit and the apparatus main body to be appropriate in a case where the movement amount of the shift unit increases, and the component tolerance of the gears is taken into consideration.

SUMMARY OF THE INVENTION

It is desirable to provide a sheet processing apparatus and an image forming apparatus that can set a meshing distance between a drive gear and a rack portion of a rack gear to an appropriate distance by preventing excessive restraint on a shift unit.

A sheet processing apparatus according to the present invention includes a shift unit including a pair of first conveying rollers that nip and convey a sheet and being able to move in a width direction orthogonal to a conveyance direction of the sheet in a state of nipping the sheet; a drive gear configured to transmit a driving force from a drive motor; a rack gear including a rack portion that meshes with the drive gear, the rack gear being configured to receive the driving force from the drive gear via the rack portion and, thereby, move the shift unit in the width direction in a state of nipping the sheet with a pair of first conveying rollers; a guide member configured to guide movement of the shift unit in the width direction; and a supporting member configured to nip the rack gear between the supporting member and the drive gear and support the rack gear, in which the rack gear is rotatable with respect to the shift unit on a plane parallel to the conveyance direction and the width direction.

Further features of the present invention will become apparent from the following description of exemplary embodiments with reference to the attached drawings.

DESCRIPTION OF THE EMBODIMENTS

Figure 1:
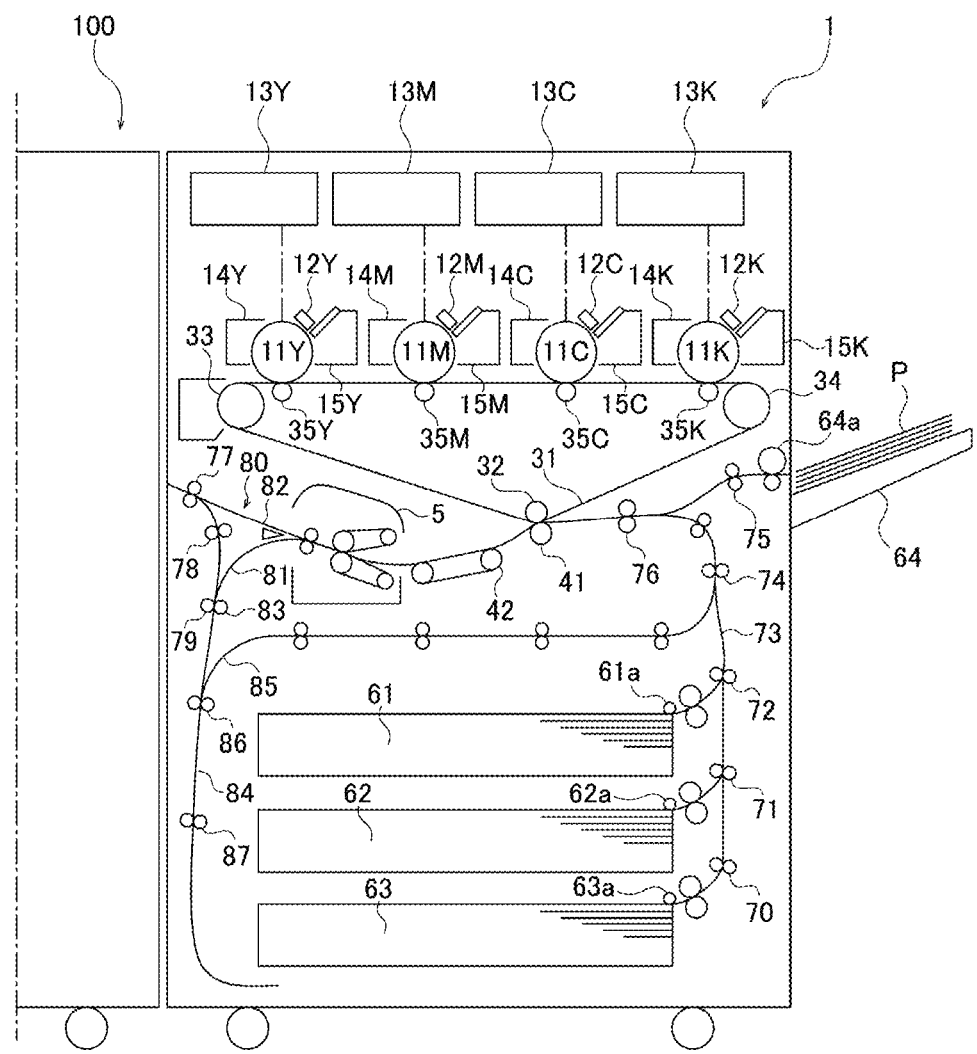
FIG. 1 is a schematic diagram of an image forming apparatus according to an embodiment of the present invention.

Hereinafter, embodiments are described in detail with reference to the drawings.

Configuration of Image Forming Apparatus

A configuration of an image forming apparatus 1 according to an embodiment of the present invention is described in detail with reference to FIG. 1.

Here, the image forming apparatus 1 is exemplified by a color image forming apparatus of an intermediate transfer tandem system using an electrophotographic system. Here, the intermediate transfer tandem system has a configuration in which image forming portions of four colors are arranged side by side on an intermediate transfer belt and has an advantage of being excellent in adaptability to various sheets P or print productivity, and thus becomes mainstream in recent years.

Specifically, the image forming apparatus 1 includes an image forming apparatus main body 2 and a sheet processing apparatus 100.

The image forming apparatus main body 2 includes a mechanism that forms an image on the sheet P and discharges the sheet P on which the image is formed to the sheet processing apparatus 100. The image forming apparatus main body 2 includes an image forming portion that forms an image on the sheet P. There are four sets of image forming portions of four colors of yellow (Y), magenta (M), cyan (C), and black (Bk). Note that the image forming portions are not limited to four sets of four colors and may be any set of colors such as one color of black (Bk). Furthermore, the arrangement order of the colors of yellow (Y), magenta (M), cyan (C), and black (Bk) is not limited to the order in FIG. 1 and may be any order. Details of the configuration of the image forming apparatus main body 2 are described below.

The sheet processing apparatus 100 is a stacker that discharges and stacks the sheets P conveyed by the image forming apparatus main body 2. The sheet processing apparatus 100 sorts and stacks the sheets P by shifting the position of the sheet P discharged from the image forming apparatus main body 2 in a width direction orthogonal to the conveyance direction of the sheet P (hereinafter, simply referred to as "width direction"). Note that details of the configuration of the sheet processing apparatus 100 are described below.

Configuration of Image Forming Apparatus Main Body

A configuration of the image forming apparatus main body 2 of the image forming apparatus 1 according to the embodiment of the present invention is specifically described with reference to FIGS. 1 and 2.

The image forming apparatus main body 2 includes a fixing device 5, photoconductors 11Y, 11M, 11C, and 11K, charging devices 12Y, 12M, 12C, and 12K, exposure devices 13Y, 13M, 13C, and 13K, and developing devices 14Y, 14M, 14C, and 14K. Also, the image forming apparatus main body 2 includes photoconductor cleaners 15Y, 15M, 15C, and 15K, an intermediate transfer belt 31, a secondary transfer inner roller 32, a driving roller 33, a tension roller 34, and primary transfer units 35Y, 35M, 35C, and 35K.

Also, the image forming apparatus main body 2 includes a secondary transfer outer roller 41 and a suction conveyance portion 42. Also, the image forming apparatus main body 2 includes a transfer sheet storage chamber 61, a feeding portion 61a, a transfer sheet storage chamber 62, a feeding portion 62a, a transfer sheet storage chamber 63, a feeding portion 63a, a transfer sheet storage chamber 64, a feeding portion 64a, and a pair of registration rollers 76. The image forming apparatus main body 2 further includes a sheet discharging portion 77, a switching member 81, a reverse roller 86, a reverse roller 87, and a controller 200.

The photoconductors 11Y, 11M, 11C, and 11K, the charging devices 12Y, 12M, 12C, and 12K, the exposure devices 13Y, 13M, 13C, and 13K, and the developing devices 14Y, 14M, 14C, and 14K execute an image forming process under the control of the controller 200. Also, the primary transfer units 35Y, 35M, 35C, and 35K and the photoconductor cleaners 15Y, 15M, 15C, and 15K execute the image forming process under the control of the controller 200.

The image forming process is executed in parallel by the image forming portions of Y, M, C, and Bk. Further, the image forming process is executed at a timing when a toner image of a downstream color is superimposed on a toner image of an upstream color when a toner image is primarily transferred from the photoconductors 11Y, 11M, 11C, and 11K onto the intermediate transfer belt 31 in each image forming portion.

The feeding portion 61a, the feeding portion 62a, the feeding portion 63a, the feeding portion 64a, and the pair of registration rollers 76 execute a conveyance process of the sheet P under the control of the controller 200. Also, the fixing device 5, the secondary transfer outer roller 41, the suction conveyance portion 42, and the sheet discharging portion 77 configure a conveyance unit that conveys the sheet P on which an image is formed by the image forming portion to the sheet processing apparatus 100.

The fixing device 5 applies a predetermined pressure to the sheet P conveyed by the suction conveyance portion 42 by a pair of rollers facing each other, a belt, or the like (all not illustrated) and heats the sheet P by a heat source such as a heater (not illustrated). The fixing device 5 applies a pressure to the sheet P and heats the sheet P to melt and fix the toner image secondarily transferred onto the sheet P and forms a fixed image on the sheet P. The fixing device 5 conveys the sheet P on which the fixed image is formed to the sheet discharging portion 77.

The photoconductors 11Y, 11M, 11C, and 11K rotate by the transmission of a driving force by a driving source (not illustrated).

The charging devices 12Y, 12M, 12C, and 12K uniformly charge the surfaces of the photoconductors 11Y, 11M, 11C, and 11K.

The exposure devices 13Y, 13M, 13C, and 13K form electrostatic latent images on the photoconductors 11Y, 11M, 11C, and 11K uniformly charged by the charging devices 12Y, 12M, 12C, and 12K under the control of the controller 200.

The developing devices 14Y, 14M, 14C, and 14K develop the electrostatic latent images formed on the photoconductors 11Y, 11M, 11C, and 11K by the exposure devices 13Y, 13M, 13C, and 13K with toners. The developing devices 14Y, 14M, 14C, and 14K develop the electrostatic latent images formed on the photoconductors 11Y, 11M, 11C, and 11K with toners to form toner images on the photoconductors 11Y, 11M, 11C, and 11K, and bring the electrostatic latent images to the surface.

The photoconductor cleaners 15Y, 15M, 15C, and 15K collect transfer residual toners slightly remaining on the photoconductors 11Y, 11M, 11C, and 11K and cause the photoconductors 11Y, 11M, 11C, and 11K to prepare for the next image formation again.

Figure 2:
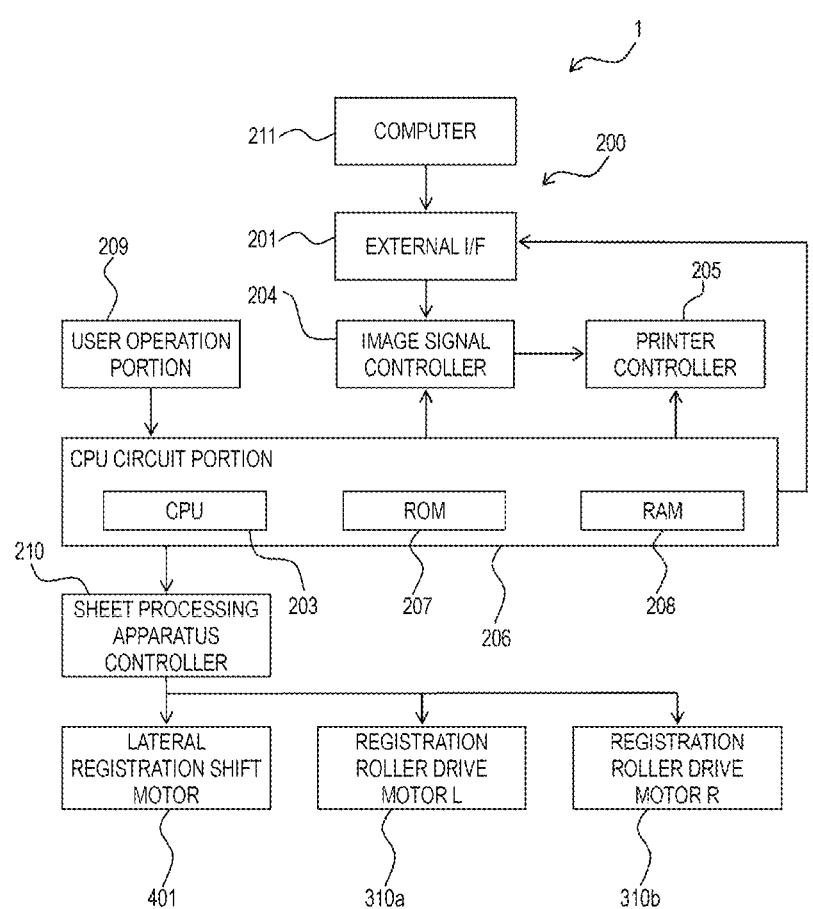
FIG. 2 is a block diagram illustrating a configuration of the image forming apparatus according to the embodiment of the present invention.
Figure 3:
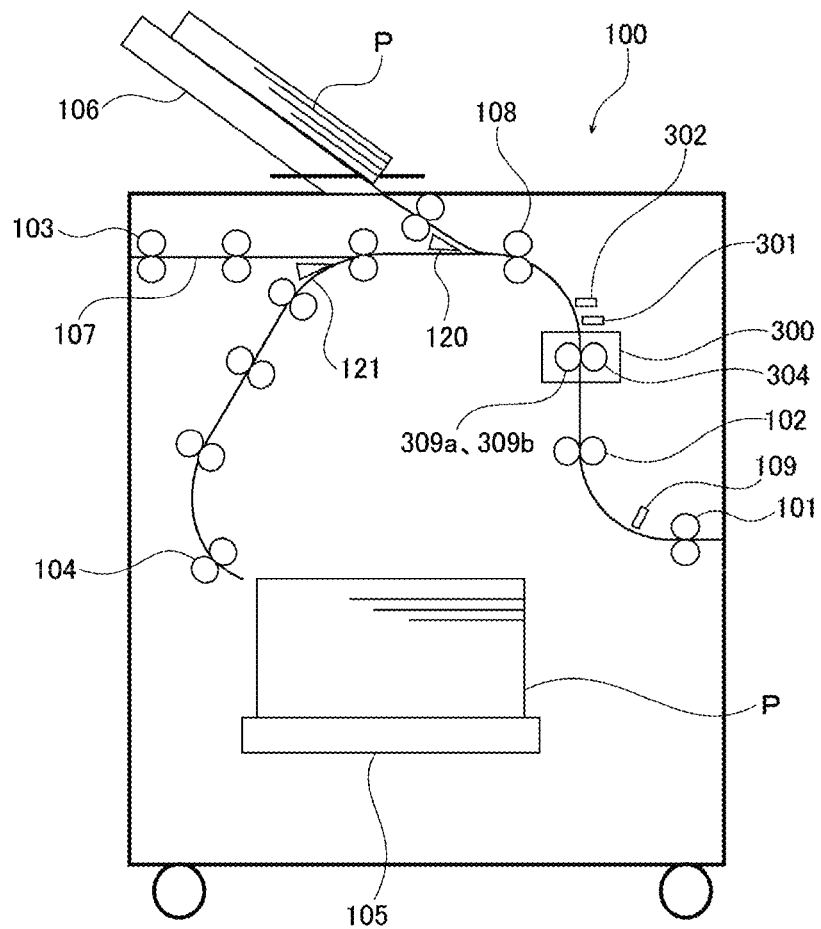
FIG. 3 is a schematic diagram of a sheet processing apparatus according to the embodiment of the present invention.
Figure 4:
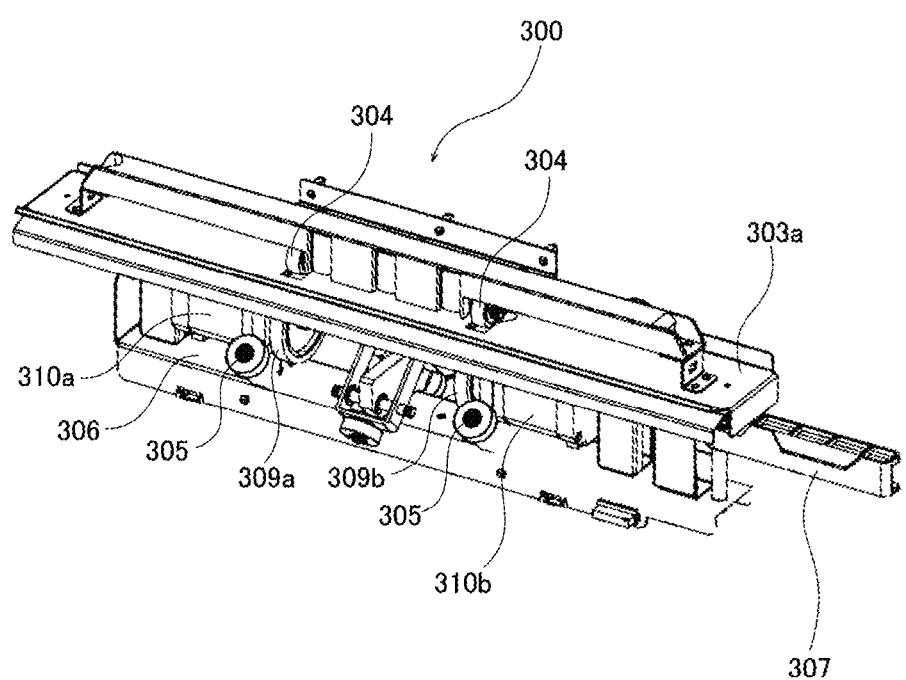
FIG. 4 is a perspective view of a registration shift unit of the sheet processing apparatus according to the embodiment of the present invention.
Figure 5:
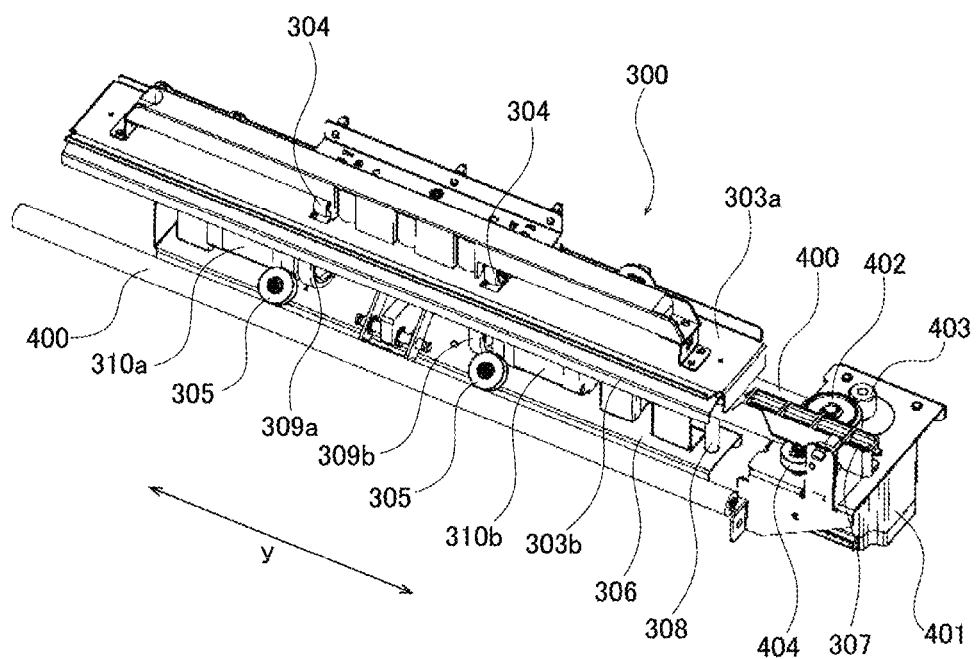
FIG. 5 is a perspective view illustrating the sheet processing apparatus according to the embodiment of the present invention in a state of being supported by a guide rail.
Figure 6:
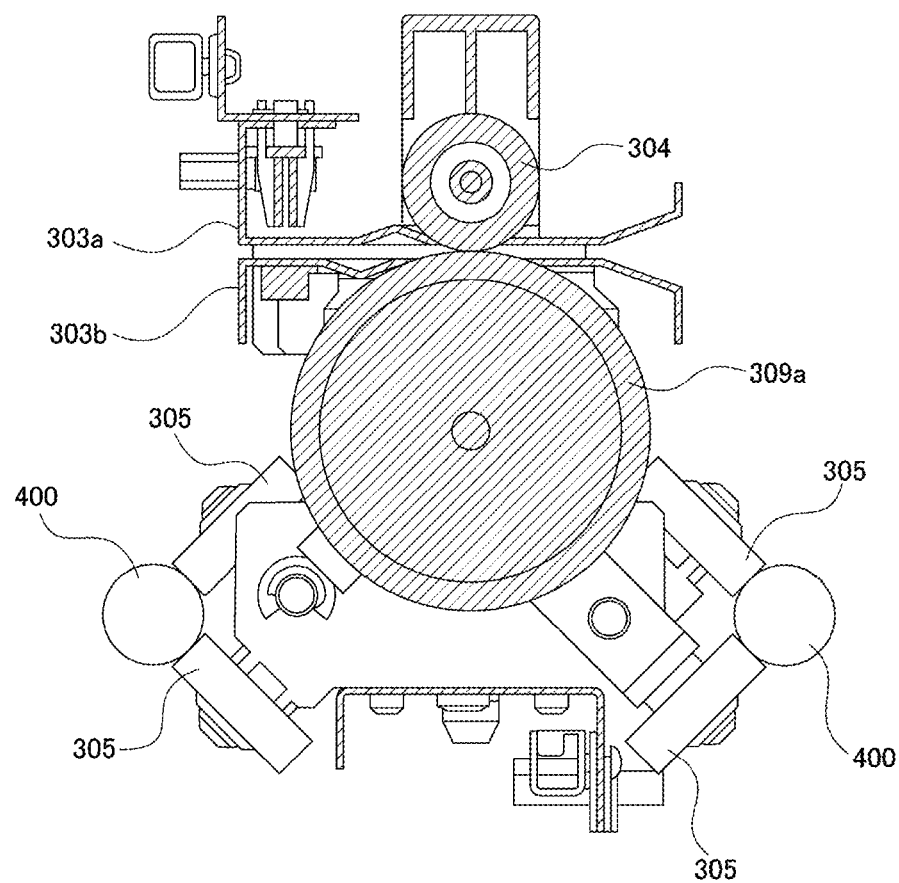
FIG. 6 is a cross-sectional view of the sheet processing apparatus according to the embodiment of the present invention.
Figure 7:
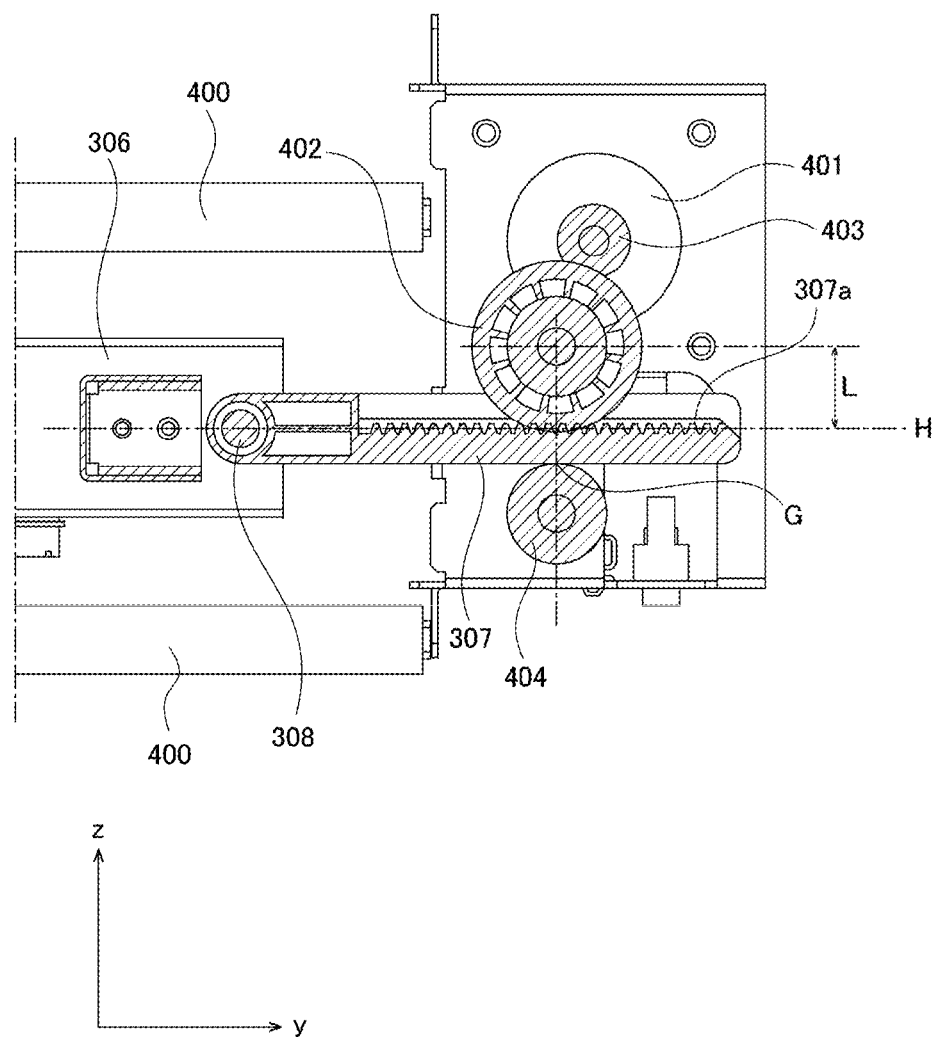
FIG. 7 is an enlarged cross-sectional view of a part of the sheet processing apparatus according to the embodiment of the present invention.

The intermediate transfer belt 31 is stretched by the secondary transfer inner roller 32, the driving roller 33, and the tension roller 34 and is conveyed and driven in a clockwise direction in FIG. 1. On the intermediate transfer belt 31, full-color toner images are primarily transferred from the photoconductors 11Y, 11M, 11C, and 11K by the primary transfer units 35Y, 35M, 35C, and 35K and formed. The intermediate transfer belt 31 conveys the primarily transferred full-color toner image to a toner image transfer nip portion formed by the secondary transfer inner roller 32 and the secondary transfer outer roller 41.

The secondary transfer inner roller 32 faces the secondary transfer outer roller 41 and forms a toner image transfer nip portion that transfers a toner image to the sheet P together with the secondary transfer outer roller 41. The secondary transfer inner roller 32 applies a predetermined pressure together with the secondary transfer outer roller 41 to the sheet P and the intermediate transfer belt 31 conveyed by the pair of registration rollers 76 in the toner image transfer nip portion.

The driving roller 33 is provided inside the intermediate transfer belt 31 and rotationally drives the intermediate transfer belt 31 by transmission of a driving force from the driving source (not illustrated).

The tension roller 34 is provided inside the intermediate transfer belt 31 and applies tension to the intermediate transfer belt 31.

The primary transfer units 35Y, 35M, 35C, and 35K are applied with an electrostatic load bias and apply a predetermined pressure to the photoconductors 11Y, 11M, 11C, and 11K and the intermediate transfer belt 31. The primary transfer units 35Y, 35M, 35C, and 35K primarily transfer the toner images formed on the photoconductors 11Y, 11M, 11C, and 11K onto the intermediate transfer belt 31 by being applied with an electrostatic load bias and applying a predetermined pressure.

The secondary transfer outer roller 41 applies the electrostatic load bias to the sheet P and the intermediate transfer belt 31 conveyed by the pair of registration rollers 76 in the toner image transfer nip portion formed together with the secondary transfer inner roller 32. The secondary transfer inner roller 32 and the secondary transfer outer roller 41 secondarily transfer the toner image primarily transferred to the intermediate transfer belt 31 in the toner image transfer nip portion onto the sheet P. The secondary transfer outer roller 41 conveys the sheet P on which the toner image is secondarily transferred to the suction conveyance portion 42 together with the secondary transfer inner roller 32.

The suction conveyance portion 42 sucks the sheet P conveyed by the secondary transfer inner roller 32 and the secondary transfer outer roller 41 with air by a fan or the like and conveys the sheet P to the fixing device 5.

The sheets P are stacked and stored in the transfer sheet storage chamber 61.

The feeding portion 61a feeds the sheet P stored in the transfer sheet storage chamber 61 to the pair of registration rollers 76 according to the image forming timing.

The sheets P are stacked and stored in the transfer sheet storage chamber 62.

The feeding portion 62a feeds the sheet P stored in the transfer sheet storage chamber 62 to the pair of registration rollers 76 according to the image forming timing.

The sheets P are stacked and stored in the transfer sheet storage chamber 63.

The feeding portion 63a feeds the sheet P stored in the transfer sheet storage chamber 63 to the pair of registration rollers 76 according to the image forming timing.

The sheets P are stacked and stored in the transfer sheet storage chamber 64.

The feeding portion 64a feeds the sheet P stored in the transfer sheet storage chamber 64 to the pair of registration rollers 76 according to the image forming timing.

The pair of registration rollers 76 cause the sheet P fed by the feeding portion 61a, the feeding portion 62a, the feeding portion 63a, or the feeding portion 64a or the sheet P conveyed from a duplex conveying path 85 to abut to form a loop on the sheet P. The pair of registration rollers 76 correct skew feeding by causing the skew feeding to follow the leading end of the sheet P on which the loop is formed. The pair of registration rollers 76 convey the sheet P to the toner image transfer nip portion at a predetermined timing after correcting skew feeding of the sheet P. Here, the predetermined timing is a timing of image formation on the sheet P, specifically, a timing of aligning a position to which the toner image of the sheet P is transferred with a position of the toner image carried on the rotating photoconductors 11Y, 11M, 11C, and 11K.

The sheet discharging portion 77 conveys the sheet P conveyed by the fixing device 5 to the sheet processing apparatus 100.

The switching member 81 swings between a position where the sheet P conveyed by the fixing device 5 is conveyed to a sheet discharging conveying path 82 and a position where the sheet P is conveyed to a reverse path 83 and a switchback path 84 by the action of a solenoid (not illustrated) controlled by the controller 200. The switching member 81 swings to select the path of the sheet P. The switching member 81 enables the sheet P to be conveyed to the sheet processing apparatus 100 when the sheet P is at a position to be conveyed to the sheet discharging conveying path 82. When the sheet P is at a position to be conveyed to the reverse path 83 and the switchback path 84, the switching member 81 enables the sheet P to be conveyed to the reverse path 83.

The reverse roller 86 switches the leading end and the trailing end of the sheet P in the conveyance direction by performing a switchback operation of forward and reverse rotation when image formation is required on both sides of the sheet P. The reverse roller 86 forwardly rotates to draw the sheet P into the switchback path 84 and reversely rotates to convey the sheet P drawn into the switchback path 84 to the duplex conveying path 85.

The reverse roller 87 switches the leading end and the trailing end of the sheet P in the conveyance direction by performing a switchback operation of forward and reverse rotation when image formation is required on both sides of the sheet P. The reverse roller 87 forwardly rotates to draw the sheet P into the switchback path 84 and reversely rotates to convey the sheet P drawn into the switchback path 84 to the duplex conveying path 85.

The controller 200 controls the entire operation of the image forming apparatus 1.

Configuration of Controller

A configuration of the controller 200 of the image forming apparatus 1 according to an embodiment of the present invention is described in detail with reference to FIG. 2.

The controller 200 includes an external I/F 201, an image signal controller 204, a printer controller 205, a CPU circuit portion 206, and a user operation portion 209.

The external I/F 201 is an interface between the image forming apparatus 1 and an external computer 211. The external I/F 201 decompresses print data input from the computer 211 into a bitmap image and outputs the bitmap image as a digital image signal to the image signal controller 204.

The image signal controller 204 performs various types of processing on the digital image signal input from the external I/F 201 under the control of a CPU 203 described below of the CPU circuit portion 206, converts the digital image signal into a video signal, and outputs the video signal to the printer controller 205.

The printer controller 205 drives the exposure devices 13Y, 13M, 13C, and 13K via an exposure controlling portion (not illustrated) based on a video signal input from the image signal controller 204.

The CPU circuit portion 206 controls the entire operation of the image forming apparatus 1. Specifically, the CPU circuit portion 206 includes the CPU 203, a ROM 207, and a RAM 208.

The CPU 203 as a calculation unit reads and executes a control program stored in the ROM 207 to control the operation of the image forming apparatus 1 including the operation of the user operation portion 209. The CPU 203 comprehensively controls the image signal controller 204, the printer controller 205, and the sheet processing apparatus controller 210 using the RAM 208 based on a key signal input from the user operation portion 209.

The ROM 207 stores a control program in advance.

The RAM 208 temporarily holds control data input from the CPU 203 and is used as a work area for arithmetic processing accompanied by control in the CPU 203.

The user operation portion 209 includes a plurality of keys for setting sheet information such as a basis weight, a size, and a type of the sheet P and various functions related to image formation, a display portion for displaying information indicating a setting state, and the like. The user operation portion 209 displays a plurality of corresponding keys or the above information on the display portion based on a signal from the CPU circuit portion 206. The user operation portion 209 outputs a key signal corresponding to the operation of each key displayed on the display portion to the CPU circuit portion 206.

Configuration of Sheet Processing Apparatus

A configuration of the sheet processing apparatus 100 according to an embodiment of the present invention is described in detail with reference to FIGS. 2 to 7.

The sheet processing apparatus 100 includes a pair of inlet rollers 101, a pair of separating rollers 102, a pair of outlet rollers 103, a pair of discharge rollers 104, a lower stack tray 105, an upper stack tray 106, a pair of post-registration rollers 108, and an inlet sensor 109. Also, the sheet processing apparatus 100 includes a first switching member 120, a second switching member 121, a sheet processing apparatus controller 210, a registration shift unit 300, a skew feeding detection sensor 301, and a lateral registration detection sensor 302. Further, the sheet processing apparatus 100 includes a rack gear 307, a guide rail 400, a lateral registration shift motor 401, a drive gear 402, a motor gear 403, and a backup bearing 404.

The pair of inlet rollers 101 convey the sheet P conveyed by the sheet discharging portion 77 of the image forming apparatus main body 2 to the pair of separating rollers 102.

The pair of separating rollers 102 as a pair of second conveying rollers can be in a pressing state in which the pair of separating rollers 102 nip and convey the sheet P or in a separated state in which the pair of separating rollers 102 are separated from each other, by being driven by the control of the sheet processing apparatus controller 210. The pair of separating rollers 102 convey the sheet P conveyed by the pair of inlet rollers 101 in the pressing state to the registration shift unit 300 and be in the separated state when the sheet P reaches the registration shift unit 300.

The pair of outlet rollers 103 discharge the sheet P conveyed by the pair of post-registration rollers 108 via a conveying path 107 to the outside. At this time, when another sheet processing apparatus (not illustrated) is provided at the subsequent stage of the sheet processing apparatus 100, the pair of outlet rollers 103 convey the sheet P conveyed by the pair of post-registration rollers 108 via the conveying path 107 to another sheet processing apparatus at the subsequent stage.

The pair of discharge rollers 104 discharge the sheet P conveyed by the pair of post-registration rollers 108 to the lower stack tray 105.

The sheets P discharged by the pair of discharge rollers 104 are stacked on the lower stack tray 105. The lower stack tray 105 is lowered to the sheet takeout enabling position when the stacked sheets are taken out after the end of the job or in the middle of the job.

The sheet P discharged by the pair of post-registration rollers 108 is stacked on the upper stack tray 106.

The pair of post-registration rollers 108 discharge the sheet P conveyed by the registration shift unit 300 to the upper stack tray 106 or convey the sheet P to the pair of outlet rollers 103 or the pair of discharge rollers 104.

The inlet sensor 109 detects the sheet P conveyed from the pair of inlet rollers 101 to the pair of separating rollers 102 and outputs an electric signal indicating a delivery timing to the sheet processing apparatus controller 210 as a detection result.

Under the control of the sheet processing apparatus controller 210, the first switching member 120 switches between a conveying path for discharging the sheet P conveyed by the pair of post-registration rollers 108 to the upper stack tray 106 and a conveying path for conveying the sheet P to the pair of outlet rollers 103 or the pair of discharge rollers 104.

Under the control of the sheet processing apparatus controller 210, the second switching member 121 switches between the conveying path 107 for conveying the sheet P conveyed by the pair of post-registration rollers 108 to the pair of outlet rollers 103 and a conveying path for conveying the sheet P to the pair of discharge rollers 104.

The sheet processing apparatus controller 210 is provided in the sheet processing apparatus 100 and exchanges information with the CPU circuit portion 206 of the controller 200 to control the overall operation of the sheet processing apparatus 100. The sheet processing apparatus controller 210 controls driving of the pair of separating rollers 102 based on an electric signal input from the inlet sensor 109. The sheet processing apparatus controller 210 controls the drive of a registration roller drive motor L 310a and a registration roller drive motor R 310b based on the electric signal input from the skew feeding detection sensor 301 to correct the skew feeding of the sheet P.

The sheet processing apparatus controller 210 controls driving of the lateral registration shift motor 401 based on an electric signal input from the lateral registration detection sensor 302 to move the registration shift unit 300 in the width direction. Note that the sheet processing apparatus controller 210 is not limited to the configuration of being provided in the sheet processing apparatus 100 and may be a configuration of being integrated with the CPU circuit portion 206 and controlling the sheet processing apparatus 100 from the image forming apparatus main body 2.

The registration shift unit 300 moves in the width direction in a state of being nipping the sheet P under the control of the sheet processing apparatus controller 210. The registration shift unit 300 conveys the sheet P conveyed by the pair of separating rollers 102 to the pair of post-registration rollers 108. Note that details of the configuration of the registration shift unit 300 are described below.

A pair of the skew feeding detection sensors 301 are provided at both ends in the width direction. The skew feeding detection sensor 301 detects the sheet P conveyed from the registration shift unit 300 to the pair of post-registration rollers 108 and outputs an electric signal according to the detection result to the sheet processing apparatus controller 210.

The lateral registration detection sensor 302 as a sheet position detection unit detects a position of an end portion of the sheet P in the width direction in the registration shift unit 300 and outputs an electric signal according to a detection result to the sheet processing apparatus controller 210.

The rack gear 307 includes a rack portion 307a having teeth that mesh with the drive gear 402. The rack gear 307 includes a rotation center portion 308 supported by the registration shift unit 300 so as to be rotatable with respect to the sheet processing apparatus main body and the registration shift unit 300 of the sheet processing apparatus 100. The rack gear 307 is pivotally supported so as to be rotatable about the rotation center portion 308 with respect to the registration shift unit 300. The rotation center portion 308 is positioned at a connection portion between the rack gear 307 and the registration shift unit 300 on an extension line of a reference pitch line H of the rack portion 307a.

The rack gear 307 is provided on a support base 306 so that the reference pitch line H is substantially parallel to the moving direction of the registration shift unit 300 and the guiding direction by the two guide rails 400. When the drive gear 402 is rotationally driven, the driving force is transmitted from the drive gear 402 via the rack portion 307a, whereby the rack gear 307 moves the registration shift unit 300 in the width direction.

The guide rail 400 as a guide member supports the registration shift unit 300 movably in the width direction and guides the movement of the registration shift unit 300 in the width direction.

The lateral registration shift motor 401 as a drive motor is fixed without rotating with respect to the sheet processing apparatus main body of the sheet processing apparatus 100. A motor shaft of the lateral registration shift motor 401 is connected to the motor gear 403. The lateral registration shift motor 401 is driven by the control of the sheet processing apparatus controller 210 to rotationally drive the motor gear 403, thereby transmitting the driving force to the motor gear 403.

The drive gear 402 is fixed without rotating with respect to the sheet processing apparatus main body of the sheet processing apparatus 100. When the motor gear 403 is rotationally driven by meshing with the motor gear 403, the drive gear 402 is rotationally driven and transmits the driving force of the motor gear 403 to the rack gear 307 of the registration shift unit 300.

The motor gear 403 is fixed without rotating with respect to the sheet processing apparatus main body of the sheet processing apparatus 100. The motor gear 403 is inserted into and connected to a motor shaft of the lateral registration shift motor 401. The motor gear 403 is rotationally driven when the lateral registration shift motor 401 is driven.

The backup bearing 404 as a supporting member is fixed without rotating with respect to the sheet processing apparatus main body of the sheet processing apparatus 100. The backup bearing 404 supports the rack gear 307 by nipping the rack gear 307 together with drive gear 402. The backup bearing 404 is in point contact with the rack gear 307 to support the rack gear 307. The backup bearing 404 supports the rack gear 307 while rotating on the rack gear 307 when the rack gear 307 moves or rotates.

Configuration of Registration Shift Unit

A configuration of the registration shift unit 300 of the sheet processing apparatus 100 according to an embodiment of the present invention is described in detail with reference to FIGS. 4 to 7.

The registration shift unit 300 includes a registration guide 303a, a registration guide 303b, a registration driven roller 304, a slide bearing 305, a support base 306, a registration roller L 309a, and a registration roller R 309b. The registration shift unit 300 includes the registration roller drive motor L 310a, the registration roller drive motor R 310b, and a roller holding member 311. The registration driven roller 304, the registration roller L 309a, the registration driven roller 304, and the registration roller R 309b configure a pair of first conveying rollers.

The registration guide 303a is fixed to the registration guide 303b and integrated with the registration guide 303b.

The registration guide 303b is fixed to the support base 306 and integrated with the support base 306.

The registration driven roller 304 is rotatably supported by the roller holding member 311. The registration driven roller 304 is biased by a spring (not illustrated) in a direction of abutting on the registration roller L 309a and the registration roller R 309b, thereby generating a roller abutting pressure for conveying the sheet P together with the registration roller L 309a and the registration roller R 309b.

Six slide bearings 305 are provided and abut to the guide rail 400 in a rotatable and movable state.

The registration guide 303b is fixed to the support base 306. The rotation center portion 308 of the rack gear 307 is rotatably connected to the support base 306.

The registration roller L 309a is rotationally driven by driving of the registration roller drive motor L 310a. The registration roller L 309a is rotationally driven to correct skew feeding of the sheet P conveyed by the pair of separating rollers 102 and to convey the sheet P conveyed by the pair of separating rollers 102 to the pair of post-registration rollers 108 together with the registration driven roller 304.

The registration roller R 309b is rotationally driven by driving of the registration roller drive motor R 310b. The registration roller R 309b is rotationally driven to correct the skew feeding of the sheet P conveyed by the pair of separating rollers 102 and to convey the sheet P conveyed by the pair of separating rollers 102 to the pair of post-registration rollers 108 together with the registration driven roller 304.

The registration roller drive motor L 310a is fixed to the support base 306. The registration roller L 309a is press-fitted to a motor shaft of the registration roller drive motor L 310a. The registration roller drive motor L 310a is driven under the control of the sheet processing apparatus controller 210 to rotationally drive the registration roller L 309a. The registration roller drive motor L 310a can change the rotation velocity of the registration roller L 309a independently of the rotation velocity of the registration roller R 309b.

The registration roller drive motor R 310b is fixed to the support base 306. The registration roller R 309b is press-fitted to a motor shaft of the registration roller drive motor R 310b. The registration roller drive motor R 310b is driven by the control of the sheet processing apparatus controller 210 to rotationally drive the registration roller R 309b. The registration roller drive motor R 310b can change the rotation velocity of the registration roller R 309b independently of the rotation velocity of the registration roller L 309a.

The roller holding member 311 is provided in the registration guide 303a.

Overall Operation of Sheet Processing Apparatus

Figure 8:
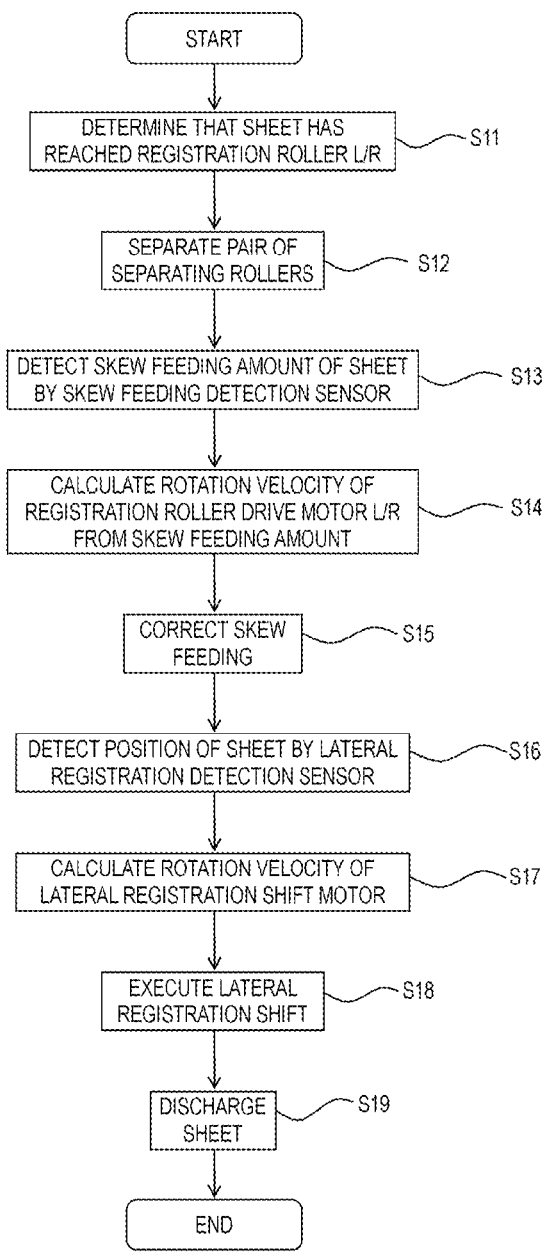
FIG. 8 is a flowchart illustrating an operation of the sheet processing apparatus according to the embodiment of the present invention.

The overall operation of the sheet processing apparatus 100 according to the embodiment of the present invention is described in detail with reference to FIG. 8.

The sheet processing apparatus 100 starts operation when the main power supply of the image forming apparatus 1 is turned on.

First, the sheet processing apparatus controller 210 determines that the sheet P reaches the registration roller L 309a and the registration roller R 309b based on the electric signal input from the inlet sensor 109 (S11). Specifically, the sheet processing apparatus controller 210 determines that the sheet P reaches the registration roller L 309a and the registration roller R 309b after a lapse of a predetermined time from the detection of the sheet P by the electric signal input from the inlet sensor 109. Here, the predetermined time can be obtained, for example, by adding a value in consideration of variations in the conveyance velocity and component crossing to a value obtained by dividing the distance between the inlet sensor 109 and the registration roller L 309a and the registration roller R 309b by the conveyance velocity of the sheet P.

Next, the sheet processing apparatus controller 210 performs control to separate the pair of separating rollers 102 from each other (S12).

Next, the sheet processing apparatus controller 210 detects the skew feeding amount of the sheet P based on the electric signal input from the skew feeding detection sensor 301 (S13). Specifically, the sheet processing apparatus controller 210 detects the skew feeding amount of the sheet P from the time difference between the time when the sheet P passes through the skew feeding detection sensor 301 provided on one end side in the width direction and the time when the sheet P passes through the skew feeding detection sensor 301 provided on the other end side in the width direction.

Next, the sheet processing apparatus controller 210 calculates the rotation velocity and the rotation time of the registration roller drive motor L 310a and the registration roller drive motor R 310b required for correcting the skew feeding of the sheet P based on the detected skew feeding amount of the sheet P (S14).

Next, the sheet processing apparatus controller 210 corrects the skew feeding of the sheet P by rotationally driving the registration roller L 309a and the registration roller R 309b so as to achieve the calculated rotation velocity in the calculated rotation time (S15). At this time, the sheet processing apparatus controller 210 corrects the skew feeding of the sheet P by providing a rotational velocity difference between the registration roller L 309a and the registration roller R 309b.

Next, the sheet processing apparatus controller 210 detects the position of the end portion of the sheet P in the width direction based on the electric signal input from the lateral registration detection sensor 302 (S16).

Next, the sheet processing apparatus controller 210 calculates the rotation velocity and the rotation time of the lateral registration shift motor 401 as parameters for moving the sheet P to the target position in the width direction based on the detection result of the position of the end portion of the sheet P in the width direction (S17).

Next, the sheet processing apparatus controller 210 drives and controls the lateral registration shift motor 401 so as to achieve the calculated rotation velocity at the calculated rotation time and executes the lateral registration shift operation (S18). Here, the lateral registration shift operation is an operation of moving the sheet P nipped by the registration roller L 309a and the registration roller R 309b and the registration driven roller 304 to the target position in the width direction. As a result, the sorting shift of the sheet P and the correction of the end position in the width direction can be performed. Note that details of the lateral registration shift operation are described below.

Next, according to a selection instruction indicated by an electrical signal input from the user operation portion 209 to the CPU circuit portion 206, the sheet processing apparatus controller 210 causes the first switching member 120 and the second switching member 121 to switch the path and conveys and discharges the sheet P (S19).

Specifically, when the user designates the stacking position of the sheet P on the upper stack tray 106, the sheet processing apparatus controller 210 switches the first switching member 120 and conveys the sheet P toward the upper stack tray 106. When the user designates conveyance to another sheet processing apparatus (not illustrated) at the subsequent stage, the sheet processing apparatus controller 210 switches the first switching member 120 and the second switching member 121 and conveys the sheet P toward the pair of outlet rollers 103 via the conveying path 107. Further, when the user designates the stacking position of the sheet P to the lower stack tray 105, the sheet processing apparatus controller 210 switches the first switching member 120 and the second switching member 121 and conveys the sheet P toward the pair of discharge rollers 104.

Note that the sheet processing apparatus controller 210 lowers the lower stack tray 105 to the sheet takeout enabling position when taking out the stacked sheets P after the end of the job or in the middle of the job.

In the above operation, for example, the conveyance velocity of the sheet P is 1000 mm/sec, and the time required for the sheet P having the minimum size in which a length in the conveyance direction is 203 mm to pass through the registration roller L 309a and the registration roller R 309b is 203 msec. Also, the time required to move the sheet P in the width direction is 75 msec, and the maximum movement amount of the sheet P in the width direction is 26 mm.

Lateral Registration Shift Operation

The lateral registration shift operation executed by the sheet processing apparatus 100 according to the embodiment of the present invention is described in detail with reference to FIGS. 4 to 11.

Figure 9A:
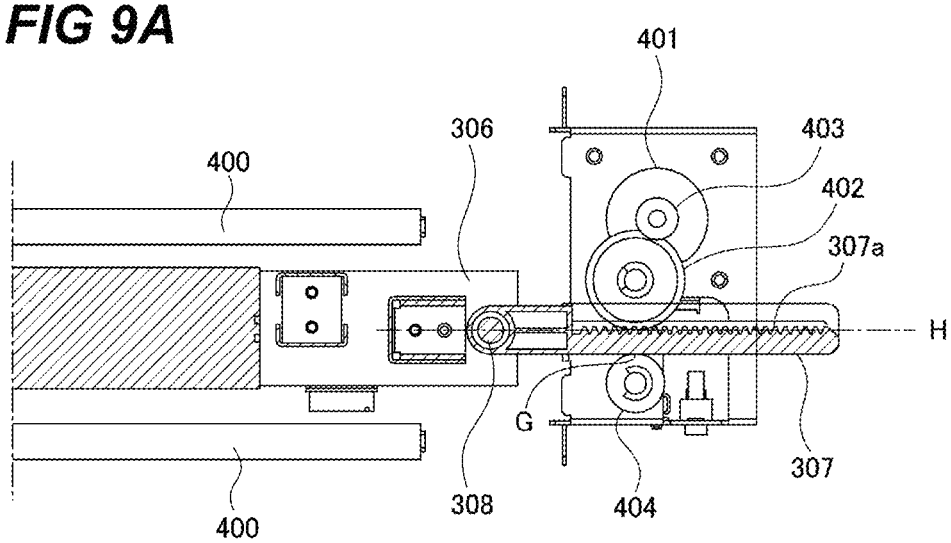
FIGS. 9A and 9B are schematic diagrams illustrating an operation of the sheet processing apparatus according to the embodiment of the present invention.
Figure 9B:
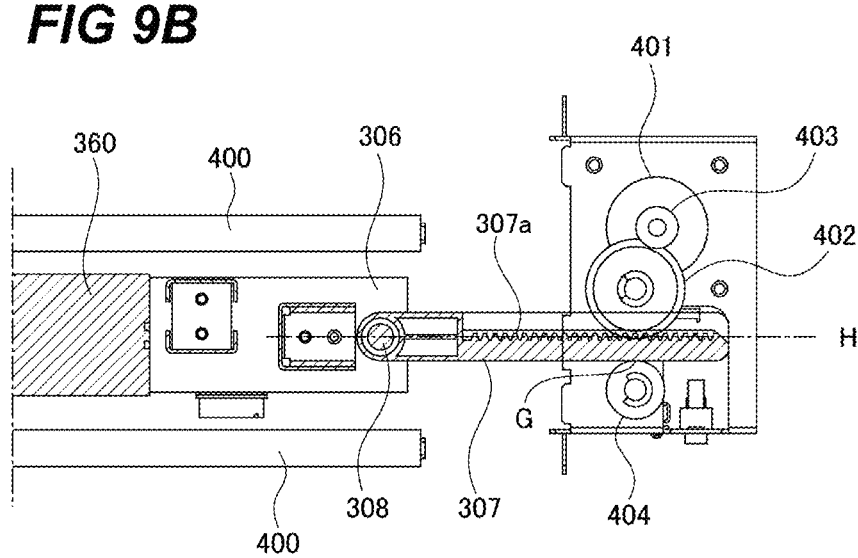
Figure 9B:
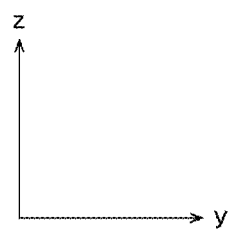

In FIGS. 9A and 9B, FIG. 9A illustrates a state in which the movement amount of the registration shift unit 300 in the width direction is larger than that in FIG. 9B, and FIG. 9B illustrates a state in which the movement amount of the registration shift unit 300 in the width direction is smaller than that in FIG. 9A.

Figure 10A:
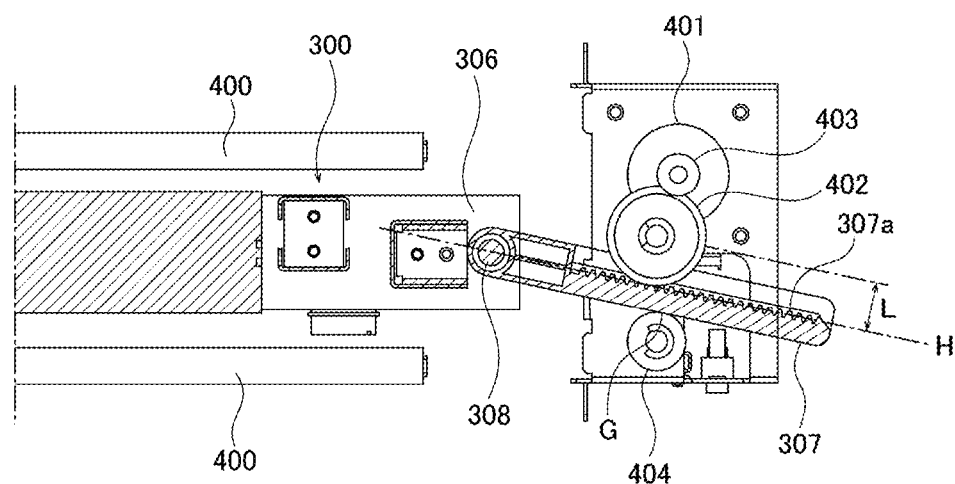
FIGS. 10A and 10B are schematic diagrams illustrating another operation of the sheet processing apparatus according to the embodiment of the present invention.
Figure 10B:
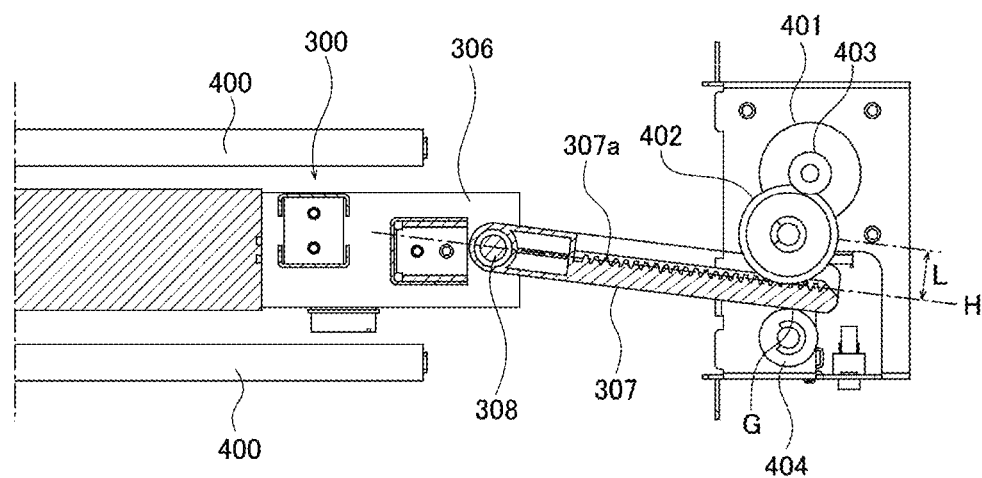

In FIGS. 10A and 10B, FIG. 10A illustrates a state in which the rotation amount of the rack gear 307 is larger than that in FIG. 10B, and FIG. 10B illustrates a state in which the rotation amount of the rack gear 307 is smaller than that in FIG. 10A.

Figure 11:
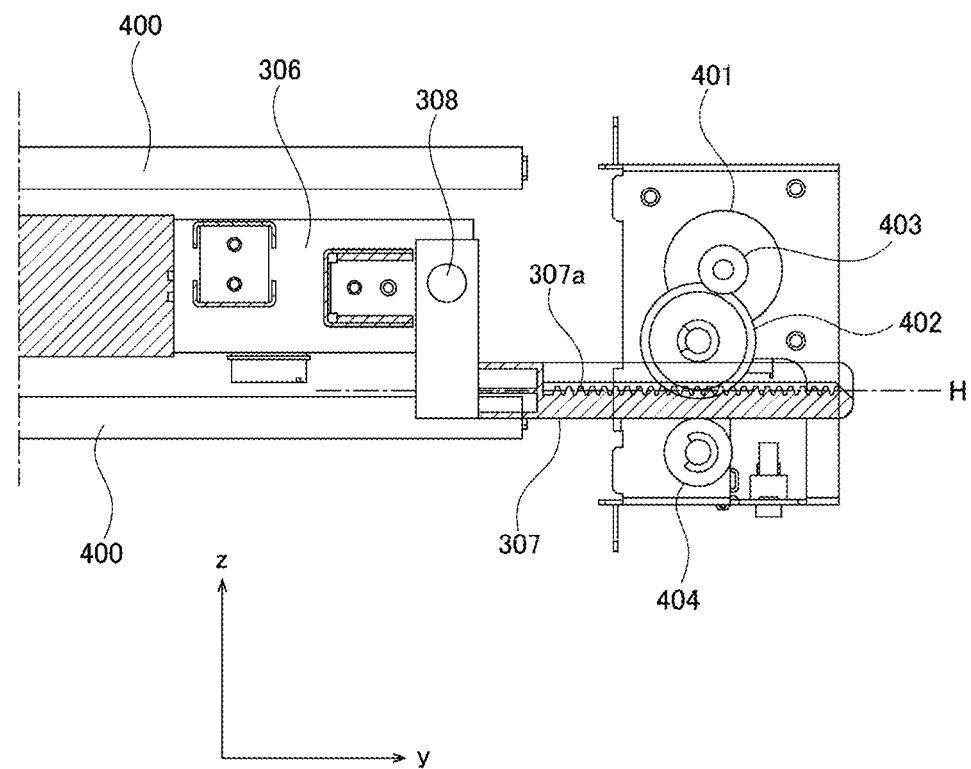
FIG. 11 is a schematic diagram illustrating an operation of a sheet processing apparatus compared with the sheet processing apparatus according to the embodiment of the present invention.

Note that, in comparison with the present embodiment, FIG. 11 illustrates a configuration in which the rotation center portion 308 of the rack gear 307 is shifted in a direction orthogonal to the reference pitch line H (up-down direction in FIG. 11).

As illustrated in FIGS. 9A and 9B, when the reference pitch line H of the rack gear 307 is substantially parallel to the two guide rails 400, the registration shift unit 300 moves in the y direction that is the width direction along the guide rails 400 by forward and reverse rotation of the lateral registration shift motor 401.

At this time, since the rotation center portion 308 is on the extension line of the reference pitch line H, a rotation moment about the rotation center portion 308 is less likely to be generated in the rack gear 307 as compared with the case where the rotation center portion 308 illustrated in FIG. 11 is shifted in the direction orthogonal to the reference pitch line H. Thus, the sheet processing apparatus 100 can efficiently convert the driving force transmitted from the lateral registration shift motor 401 to the rack gear 307 via the motor gear 403 and the drive gear 402 into the force for moving the registration shift unit 300 in the y direction.

As illustrated in FIGS. 10A and 10B, the rack gear 307 rotates with respect to the sheet processing apparatus main body and the registration shift unit 300 of the sheet processing apparatus 100 on a plane parallel to the conveyance direction and the width direction (plane parallel to the sheet surface of FIGS. 10A and 10B). In this state, when the registration shift unit 300 moves in the y direction, only the rack gear 307 rotates with respect to the registration shift unit 300, and an abutment point G, and the position of the meshing tooth between the rack portion 307a and the drive gear 402 move.

As a result, excessive restraint on the registration shift unit 300 can be prevented. Further, by preventing excessive restraint on the registration shift unit 300, the meshing distance between the drive gear 402 and the rack portion 307a of the rack gear 307 can be set to an appropriate distance. Furthermore, the distance L between the axial center of the drive gear 402 and the reference pitch line H can be kept constant, and the meshing distance of the gear can be appropriately regulated.

Further, the backup bearing 404 abuts on an abutment portion G of the rack gear 307 on the side opposite to the rack portion 307a to regulate the movement of the rack gear 307, and rotatably supports the rack gear 307 at the abutment portion G. At this time, since the backup bearing 404 and the rack gear 307 are in point contact with each other in the abutment portion G, the contact resistance between the rack gear 307 and the backup bearing 404 can be minimized when the rack gear 307 moves or rotates in the y direction.

In the present embodiment, the rack gear 307 that receives the driving force from the drive gear 402 via the rack portion 307a to move the registration shift unit 300 in the width direction in a state where the sheet P is nipped is provided. Also, the rack gear 307 is rotatable with respect to the registration shift unit 300 on the plane parallel to the conveyance direction and the width direction. As a result, by preventing excessive restraint on the registration shift unit 300, the meshing distance between the drive gear 402 and the rack portion 307a of the rack gear 307 can be set to an appropriate distance.

It goes without saying that the present invention is not limited to the above embodiment, and various modifications can be made without departing from the gist of the present invention.

Figure 12:
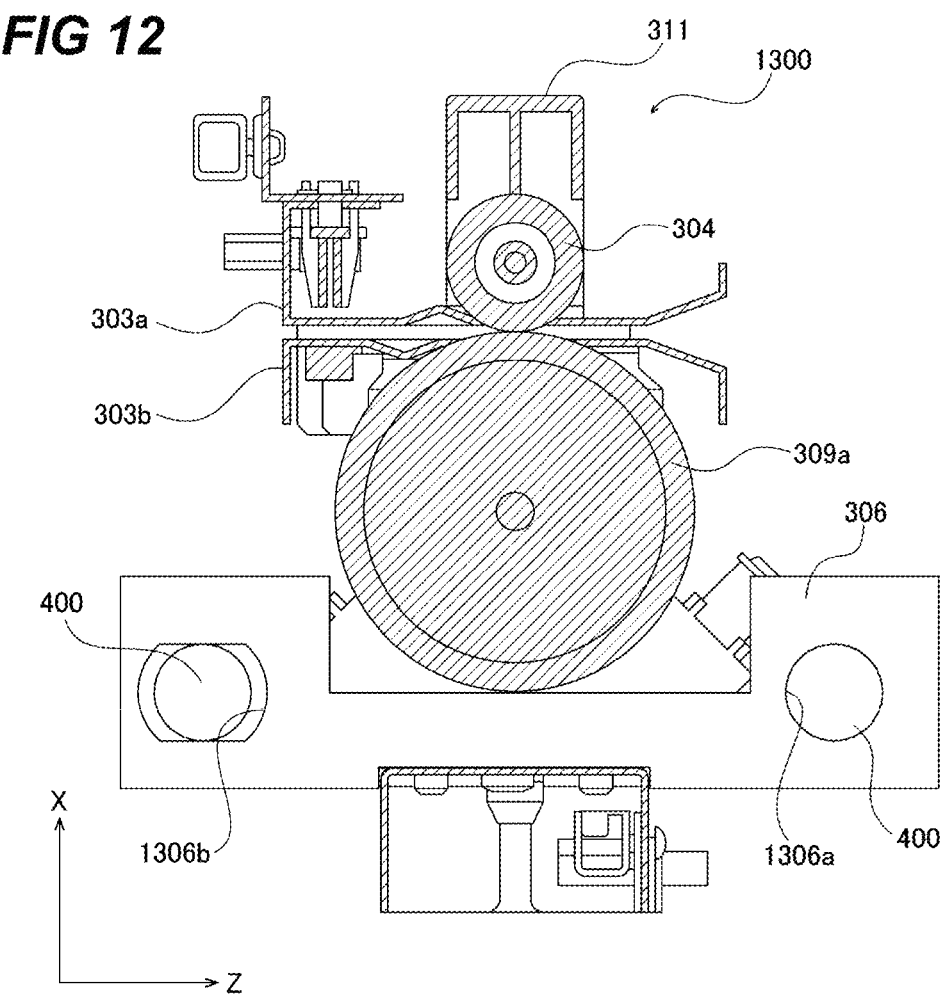
FIG. 12 is a schematic diagram of a modification of the sheet processing apparatus according to the embodiment of the present invention.

Specifically, in the above embodiment, the movement of the registration shift unit 300 is guided using the slide bearing 305, but the present invention is not limited thereto, and the movement of the registration shift unit 300 may be guided by movably engaging the support base 306 with the guide rail 400. For example, as illustrated in FIG. 12, a guide rail 400 may be movably engaged with a round hole 1306a and a long round hole 1306b provided in a support base 1306 to guide the movement of a registration shift unit 1300. Note that, in FIG. 12, since the configuration of the registration shift unit 1300 other than the support base 1306 is the same as the configuration of the registration shift unit 300, description and illustration thereof are omitted.

Also, in the above embodiment, the pair of separating rollers 102 are provided on the upstream side of the registration shift unit 300 in the conveyance direction, but the present invention is not limited thereto, and the pair of separating rollers 102 may be provided on the downstream side of the registration shift unit 300 in the conveyance direction. Alternatively, the present invention is not limited to the case where the pair of separating rollers 102 are provided on any one of the upstream side and the downstream side of the registration shift unit 300 in the conveyance direction, and the pair of separating rollers 102 may be provided on both the upstream side and the downstream side of the registration shift unit 300 in the conveyance direction.

In the above embodiment, the rotation center portion 308 of the rack gear 307 is rotatably connected to the support base 306. However, the present invention is not limited thereto, and the rotation center portion 308 may be rotatably connected to a housing such as the registration guide 303a or the registration guide 303b other than the support base 306 of the registration shift unit 300.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-178022, filed Oct. 16, 2023, which is hereby incorporated by reference herein in its entirety.

What is claimed is:

1. A sheet processing apparatus comprising:
   a shift unit including a pair of first conveying rollers that nip and convey a sheet, the shift unit being able to move in a width direction orthogonal to a conveyance direction of the sheet in a state of nipping the sheet;
   a drive gear configured to transmit a driving force from a drive motor;
   a rack gear including a rack portion that meshes with the drive gear, the rack gear being configured to receive the driving force from the drive gear via the rack portion and, thereby, move the shift unit in the width direction in a state of nipping the sheet with a pair of first conveying rollers;
   a guide member configured to guide movement of the shift unit in the width direction; and
   a supporting member configured to nip the rack gear between the supporting member and the drive gear and support the rack gear, wherein the rack gear is
rotatable with respect to the shift unit on a plane parallel to the conveyance direction and the width direction.

2. The sheet processing apparatus according to claim 1, wherein a rotation center of the rack gear is
positioned in a connection portion between the rack gear and the shift unit on an extension line of a reference pitch line of the rack portion.

3. The sheet processing apparatus according to claim 1, wherein the supporting member is
in point contact with the rack gear and supports the rack gear.

4. The sheet processing apparatus according to claim 1, wherein the supporting member
supports the rack gear while rotating on the rack gear when the shift unit is moved in the width direction by the rack gear.

5. The sheet processing apparatus according to claim 1, further comprising:
   a sheet position detection unit configured to detect a position of a sheet in the width direction; and
   a calculation unit configured to calculate a parameter for moving the shift unit to a target position in the width direction based on a detection result of the sheet position detection unit;
wherein the shift unit
moves in the width direction according to the parameter calculated by the calculation unit.

6. The sheet processing apparatus according to claim 1, further comprising:
   a pair of second conveying rollers provided on at least one of an upstream side and a downstream side of the pair of first conveying rollers in the conveyance direction, the pair of second conveying rollers being in either a pressing state in which the pair of second conveying rollers nip and convey the sheet or in a separated state in which the pair of second conveying rollers are separated from each other,
wherein the pair of second conveying rollers are
in the separated state before the shift unit moves in the width direction.

7. An image forming apparatus comprising:
   the sheet processing apparatus according to claim 1;
   an image forming portion configured to form an image on a sheet; and
   a conveyance unit configured to convey the sheet on which the image is formed by the image forming portion to the sheet processing apparatus.

* * * * *